US011659621B2

(12) United States Patent
Backman et al.

(10) Patent No.: US 11,659,621 B2
(45) Date of Patent: *May 23, 2023

(54) SELECTION OF IP VERSION

(71) Applicant: Telefonaktiebolaget LM Ericsson (publ), Stockholm (SE)

(72) Inventors: Jan Backman, Kärna (SE); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,926

(22) Filed: Jun. 10, 2022

(65) Prior Publication Data

US 2022/0418038 A1 Dec. 29, 2022

Related U.S. Application Data

(63) Continuation of application No. 16/322,707, filed as application No. PCT/EP2018/061996 on May 9, 2018, now Pat. No. 11,375,576.

(Continued)

(51) Int. Cl.
*H04W 80/04* (2009.01)
*H04W 76/10* (2018.01)
(Continued)

(52) U.S. Cl.
CPC ......... *H04W 80/045* (2013.01); *H04L 69/167* (2013.01); *H04W 76/10* (2018.02); *H04W 76/12* (2018.02); *H04W 76/15* (2018.02)

(58) Field of Classification Search
CPC .... H04W 80/045; H04W 76/10; H04L 69/167
See application file for complete search history.

(56) References Cited

U.S. PATENT DOCUMENTS

2007/0168472 A1 7/2007 Walter
2009/0232022 A1 9/2009 Savolainen et al.
(Continued)

FOREIGN PATENT DOCUMENTS

CN 101166178 4/2008
CN 102170621 8/2011
(Continued)

OTHER PUBLICATIONS

3GPP TS 23.501 V0.3.0 (Feb. 2017), 10 pages (Year: 2017).
(Continued)

*Primary Examiner* — Sharmin Chowdhury
(74) *Attorney, Agent, or Firm* — Rothwell, Figg, Ernst & Manbeck, P.C.

(57) ABSTRACT

A method, a wireless device and a session management node for IP version selection for a PDU session requested to be established by a WCD, that supports PDU sessions of both IPv4 and IPv6 and that is configured to operatively communicate via a RAN with a SM node in a core network 101, the method being performed by the WCD comprises: sending S110 a first PDU session request message towards the SM node requesting establishment of a first PDU session, which request message comprises IP-version information indicating that the IP version of the requested first PDU session should be any one of IPv4 or IPv6; and receiving S130, S140, in response to sending the first PDU session request message, a first response message, which first response message comprises WCD information indicating the IP-version (i.e. IPv4 or IPv6) that has been selected for the requested first PDU session.

6 Claims, 5 Drawing Sheets

Related U.S. Application Data

(60) Provisional application No. 62/503,519, filed on May 9, 2017.

(51) Int. Cl.
  *H04L 69/167*   (2022.01)
  *H04W 76/12*    (2018.01)
  *H04W 76/15*    (2018.01)

(56) References Cited

U.S. PATENT DOCUMENTS

| | | |
|---|---|---|
| 2011/0007671 A1 | 1/2011 | Yu |
| 2018/0295659 A1 | 10/2018 | Shan |
| 2019/0124508 A1 | 4/2019 | Watfa |

FOREIGN PATENT DOCUMENTS

| | | |
|---|---|---|
| CN | 105338655 | 2/2016 |
| CN | 106332178 | 1/2017 |
| WO | 2016064201 | 4/2016 |
| WO | 2017/078776 | 11/2017 |

OTHER PUBLICATIONS

3GPP TS 23.502 V0.3.0 (Mar. 2017), 4 pages (Year: 2017).
3GPP TS 23.502 V0.3.0 (Mar. 2017), p. 1, 30-34, (Year: 2017).
International Search Report and Written Opinion dated Aug. 17, 2018 issued in International Application No. PCT/EP2018/061996. (8 pages).
International Preliminary Report on Patentability dated Dec. 21, 2018 issued in International Application No. PCT/EP2018/061996. (12 pages).
China Mobile, "Select the Proper PDN/PDP Type for Multi-mode Terminals with IPv6 Support", 3GPP TSG SA WG2 Meeting #83, TD S2-110487, Salt Lake City, Utah, Feb. 21-25, 2011. (2 pages).
Extended European Search Report dated Mar. 27, 2020 issued in European Patent Application No. 19206947.4. (9 pages).
3GPP TS 23.501 v0.4.0 (Apr. 2017); 3rd Generation Partnership Project; Technical Specification Group Services and System Aspects; System Architecture for the 5G System; Stage 2 (Release 15) (Apr. 2017). (124 pages).
Ericsson, "PDU Session IP version handling", SA WG2 Temporary Document, SA WG2 Meeting #117, S2-165559, Kaohsiung City, Taiwan, Oct. 17-21, 2016 (7 pages).
3GPP TS 23.502, V0.2.0 (Feb. 2017), 3rd Generation Partnership Project; Technical Specification Group Services and System Aspects; Procedures for the 5G System; Stage 2 (Release 15), Feb. 2017 (71 pages).
Ericsson, "23.501: Selection of IP version during setup of a PDU session", SA WG2 Meeting #121, S2-173004, Hangzhou, China May 15-19, 2017 (4 pages).

SELECTION OF IP VERSION

CROSS-REFERENCE TO RELATED APPLICATIONS

This application is a continuation of U.S. application Ser. No. 16/322,707, filed on May 9, 2018 (status Pending), which is the National Stage of International Patent Application No. PCT/EP2018/061996, filed May 9, 2018, which claims priority to U.S. provisional application No. 62/503,519, filed on May 9, 2017. The above identified applications are incorporated by this reference.

TECHNICAL FIELD

Embodiments presented herein relate to methods, wireless communication devices, computer programs, and a computer program product for selection of IP version during setup of a PDU session in a wireless communications system.

BACKGROUND

The standardization organization Third Generation Partnership Project (3GPP) is currently in the processes of specifying a new Fifth Generation (5G) Mobile Telecommunications System including a Next Generation (NG) Packet Core Network (NG-CN or NGC or 5GC).

The 5G System architecture is defined to support data connectivity and services enabling deployments to use techniques such as e.g. Network Function Virtualization and Software Defined Networking. The 5G System architecture shall leverage service-based interactions between Control Plane (CP) Network Functions where identified.

Some key principles and concept are to: Separate the User Plane (UP) functions from the Control Plane (CP) functions, allowing independent scalability, evolution and flexible deployments e.g. centralized location or distributed (remote) location. Modularize the function design, e.g. to enable flexible and efficient network slicing. Wherever applicable, define procedures (i.e. the set of interactions between network functions) as services, so that their re-use is possible. Enable each Network Function to interact with other NF directly if required. The architecture does not preclude the use of an intermediate function to help route Control Plane messages (e.g. like a DRA). Minimize dependencies between the Access Network (AN) and the Core Network (CN). The architecture is defined with a converged access-agnostic core network with a common AN-CN interface which integrates different 3GPP and non-3GPP access types. Support a unified authentication framework. Support "stateless" NFs, where the "compute" resource is decoupled from the "storage" resource. Support capability exposure. Support concurrent access to local and centralized services. To support low latency services and access to local data networks, UP functions can be deployed close to the Access Network. Support roaming with both Home routed traffic as well as Local breakout traffic in the visited PLMN.

FIG. 1 depicts an exemplifying 5G System architecture in the non-roaming case, using the reference point representation showing how various network functions interact with each other. The exemplifying 5G System architecture in FIG. 1 is well known to those skilled in the art and it needs no detailed description as such. Further details about the 5G System architecture can e.g. be found in the 3GPP Technical Specification TS 23.501 V0.4.0 (2017-04).

The exemplifying 5G System architecture in FIG. 1 consists of the following network functions (NFs):
  Authentication Server Function (AUSF)
  Core Access and Mobility Management Function (AMF)
  Data network (DN), e.g. operator services, Internet access or 3rd party services
  Structured Data Storage network function (SDSF)
  Unstructured Data Storage network function (UDSF)
  Network Exposure Function (NEF)
  NF Repository Function (NRF)
  Policy Control function (PCF)
  Session Management Function (SMF)
  Unified Data Management (UDM)
  User plane Function (UPF)
  Application Function (AF)
  User Equipment (UE)
  (Radio) Access Network ((R)AN)

Further, the 5G System Architecture contains reference points or interfaces via which the functions in the 5G system communicates. For example, the exemplifying 5G System Architecture in FIG. 1 contains the following reference points:
  N1: Reference point between the UE and the AMF.
  N2: Reference point between the (R)AN and the AMF.
  N3: Reference point between the (R)AN and the UPF.
  N4: Reference point between the SMF and the UPF.
  N5: Reference point between the PCF and an Application Function (AF).
  N6: Reference point between the UPF and a Data Network.
  N7: Reference point between the SMF and the PCF.
  N8: Reference point between the UDM and the AMF.
  N9: Reference point between two Core UPFs.
  N10: Reference point between the UDM and the SMF.
  N11: Reference point between the AMF and the SMF.
  N12: Reference point between AMF and AUSF.
  N13: Reference point between the UDM and Authentication Server function the AUSF.
  N14: Reference point between two AMFs.
  N15: Reference point between the PCF and the AMF in case of non-roaming scenario, PCF in the visited network and AMF in case of roaming scenario.

It should be noted that some or all of reference points indicated above may have corresponding service based interfaces associated with the 5GC function in question. For example, the following service based interfaces may be present in the 5G System Architecture:
  Namf: Service-based interface exhibited by AMF.
  Nsmf: Service-based interface exhibited by SMF.
  Nnef: Service-based interface exhibited by NEF.
  Npcf: Service-based interface exhibited by PCF.
  Nudm: Service-based interface exhibited by UDM.
  Naf: Service-based interface exhibited by AF.
  Nnrf: Service-based interface exhibited by NRF.
  Nausf: Service-based interface exhibited by AUSF.

In the 5G System architecture of FIG. 1 it is assumed that a User Equipment (UE) or similar is configured to operatively connect and communicated with the 5GC network via the RAN, e.g. via a base station or similar arranged in a Radio Access Network (RAN). The UE or similar is a device by which a subscriber accesses services offered by an operator's network and services outside operator's network to which the operators RAN and 5GC network provide access, e.g. access to the Internet or similar Packet Data Network (PDN). The UE in FIG. 1 may be any device, mobile or stationary, enabled to communicate in the 5G system, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE or similar may be portable, pocket storable, hand held, computer comprised, or vehicle mounted devices, enabled to communicate voice and/or data, via the RAN, with another entity, e.g. such as another UE or a server such as an Application Server (AS) or similar.

The Radio Access Network (RAN) in FIG. 1 may comprise a number of RAN nodes, e.g. such as base stations or similar. The RAN node may be any element capable of wireless communication with the UE or similar at one end and a 5GC network serving the UE at the other end.

The fifth generation core (5GC) network in FIG. 1 contains various functions, e.g. the Access and Mobility Management function (AMF), the Session Management function (SMF) and the User Plane Function (UPF) etc. Such functions are exchangeable denoted nodes herein. Such functions/nodes may be implemented in hardware or software or a combination of hardware and software. Such functions/nodes may be implemented in one (1) single node or in two (2) or more sub-nodes or similar that logically form the function/node in question. The sub-nodes may be located in the same geographic location or different geographic locations.

The Access and Mobility Management function (AMF) in FIG. 1 may e.g. include the following functionality. Some or all of the AMF functionalities may be supported in a single instance of a AMF:

Termination of RAN CP interface (N2).
Termination of NAS (N1), NAS ciphering and integrity protection.
Registration management.
Connection management.
Reachability management.
Mobility Management.
Lawful intercept (for AMF events and interface to LI System).
Provide transport for SM messages between UE and SMF.
Transparent proxy for routing SM messages.
Access Authentication.
Access Authorization.
Provide transport for SMS messages between UE and SMSF.
Security Anchor Function (SEA). It interacts with the AUSF and the UE, receives the intermediate key that was established as a result of the UE authentication process. In case of USIM based authentication, the AMF retrieves the security material from the AUSF.
Security Context Management (SCM). The SCM receives a key from the SEA that it uses to derive access-network specific keys.

The Session Management function (SMF) in FIG. 1 may e.g. include the following functionality. Some or all of the SMF functionalities may be supported in a single instance of a SMF:

Session Management e.g. Session establishment, modify and release, including tunnel maintain between UPF and AN node.
UE IP address allocation & management (incl optional Authorization).
Selection and control of UP function.
Configures traffic steering at UPF to route traffic to proper destination.
Termination of interfaces towards Policy control functions.
Control part of policy enforcement and QoS.
Lawful intercept (for SM events and interface to LI System).
Termination of SM parts of NAS messages.
Downlink Data Notification.
Initiator of AN specific SM information, sent via AMF over N2 to AN.
Determine SSC mode of a session.
Roaming functionality:
Handle local enforcement to apply QoS SLAs (VPLMN).
Charging data collection and charging interface (VPLMN).
Lawful intercept (in VPLMN for SM events and interface to LI System).
Support for interaction with external DN for transport of signalling for PDU session authorization/authentication by external DN.

Now, the UE or similar may not know which Internet Protocol (IP) version(s)—e.g. IP version 4 (IPv4) or IP version 6 (IPv6)—that is/are supported by the 5GC function (e.g. the AMF or SMF or similar) to which it connects. It may also be that the UE or similar supports both IPv4 and IPv6, or only supports a single IP version.

In the 3GPP Evolved Packet Core (EPC) this was handled through the UE requesting a Packet Data Network (PDN) connection of type IPv4v6 when it supports both IPv4 and IPv6. A PDN Connection is an association between the UE and a PDN. The EPC (or rather the relevant EPC node that is addressed by the PDN connection request) will then generate a response of PDN type IPv4, IPv6, IPv4v6 (dual stack) or IPv4+IPv6 (or in reality IPv6+a cause code asking for IPv4, or IPv4+a cause code asking for IPv6, which will generate two (2) separate PDN connections in the EPC, i.e. an IPv4 and an IPv6 connection).

However, IPv4v6 sessions are not supported by the 5GC and this means that a UE or similar capable of handling both IPv4 and IPv6 must have a way to ask the network which IP version to use for a Protocol Data Unit (PDU) session. It may be clarified that the 5G PDU session is similar to the EPC PDN connection in that the PDU session is an association between an UE or similar and a PDN.

Hence, there is a need to improve the method of selecting an IP-version for a PDU session.

SUMMARY

An object of embodiments herein is to improve the method of selecting an IP-version for a PDU session.

According to a first aspect there is presented a method for Internet Protocol, IP, version selection for a Protocol Data Unit, PDU, session requested to be established by a Wireless Communication Device, WCD, that supports PDU sessions of both Internet Protocol version 4, IPv4, and Internet Protocol version 6, IPv6, and that is configured to operatively communicate via a Radio Access Network, RAN with a session management, SM, node in a core network.

The method being performed by the WCD comprises: sending a first PDU session request message towards the SM node requesting establishment of a first PDU session, which request message comprises IP-version information indicating that the IP version of the requested first PDU session should be any one of IPv4 or IPv6; and receiving, in response to sending the first PDU session request message, a first response message, which first response message comprises WCD information indicating the IP-version (i.e. IPv4 or IPv6) that has been selected for the requested first PDU session.

According to a second aspect there is presented a Wireless Communication Device, WCD, configured to operatively support PDU sessions of both Internet Protocol version 4, IPv4, and Internet Protocol version 6, IPv6, and to operatively communicate via a Radio Access Network, RAN with a session management, SM, node in a core network The WCD comprises processing circuitry that is configured to cause the WCD to operatively send a first PDU session request message towards the SM node requesting establishment of a first PDU session, which request message comprises IP version information indicating that the IP version of the requested first PDU session should be any one of IPv4 or IPv6; and receive, in response to sending the first PDU session request message, a first response message, which first response message comprises WCD information indicating the IP version (i.e. IPv4 or IPv6) that has been selected for the requested first PDU session.

According to a third aspect there is presented a method for Internet Protocol, IP, version selection for a Protocol Data Unit, PDU, session requested to be established by a Wireless Communication Device, WCD, that supports PDU sessions of both Internet Protocol version 4, IPv4, and Internet Protocol version 6, IPv6, and that is configured to operatively communicate via a Radio Access Network, RAN with a session management, SM, node in a core network (101).

The method being performed by the SM node comprises: receiving a SM request message requesting establishment of a first PDU session, which SM request message comprises IP-version information indicating that the IP version of the requested first PDU session should be any one of IPv4 or IPv6; selecting, in response to receiving the SM request message, an IP-version (i.e. IPv4 or IPv6) for the requested first PDU session, and sending a first response message, which first response message comprises WCD information indicating the IP-version (i.e. IPv4 or IPv6) that has been selected for the requested first PDU session.

According to a fourth aspect there is presented a session management, SM, node in a core network being configured to operatively select an Internet Protocol, IP, version for a Protocol Data Unit, PDU, session requested to be established by a Wireless Communication Device, WCD, that supports PDU sessions of both Internet Protocol version 4, IPv4, and Internet Protocol version 6, IPv6.

The SM node comprises processing circuitry that is configured to cause the WCD to operatively: receive a SM request message requesting establishment of a first PDU session, which SM request message comprises IP-version information indicating that the IP version of the requested first PDU session should be any one of IPv4 or IPv6; select, in response to receiving the SM request message, an IP-version (i.e. IPv4 or IPv6) for the requested first PDU session, and send a first response message, which first response message comprises WCD information indicating the IP-version (i.e. IPv4 or IPv6) that has been selected for the requested first PDU session.

The above improve method of selecting an IP-version for a PDU session saves additional signalling compared to other alternatives. In particular, a WCD that supports PDU sessions of both Internet Protocol version 4, IPv4, and Internet Protocol version 6, IPv6, can initially request and get a single PDU session of a first IP version (IPv4 or IPv6), and then decide whether it is desired and allowed to request a further PDU session of the second IP version. In other words, there is no risk that two (2) PDU session with different IP-versions are unnecessary established when the WCD is satisfied with one PDU session. For example, when an IPv6 PDU session is established as the first PDU session then it may be unnecessary to also establish a second IPv4 PDU session, even if this is allowed by the network.

Embodiments herein provides 5GC network control of the IP version that is used for a PDU session in case the UE or similar supports both the IPv4 and IPv6 version. The solution also optimizes the signalling used since the UE or similar is informed about whether the IP version that is not used for the PDU Session is supported by the 5GC network. In this way the UE or similar can decide whether it is worth to try to request a PDU Session for that other IP version or not.

Generally, all terms used in the disclosure are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The proposed solutions are now described, by way of example, with reference to the accompanying drawings, in which:

FIG. 3B is a signalling diagram illustrating embodiments of methods presented herein;

DETAILED DESCRIPTION

Figure 1:
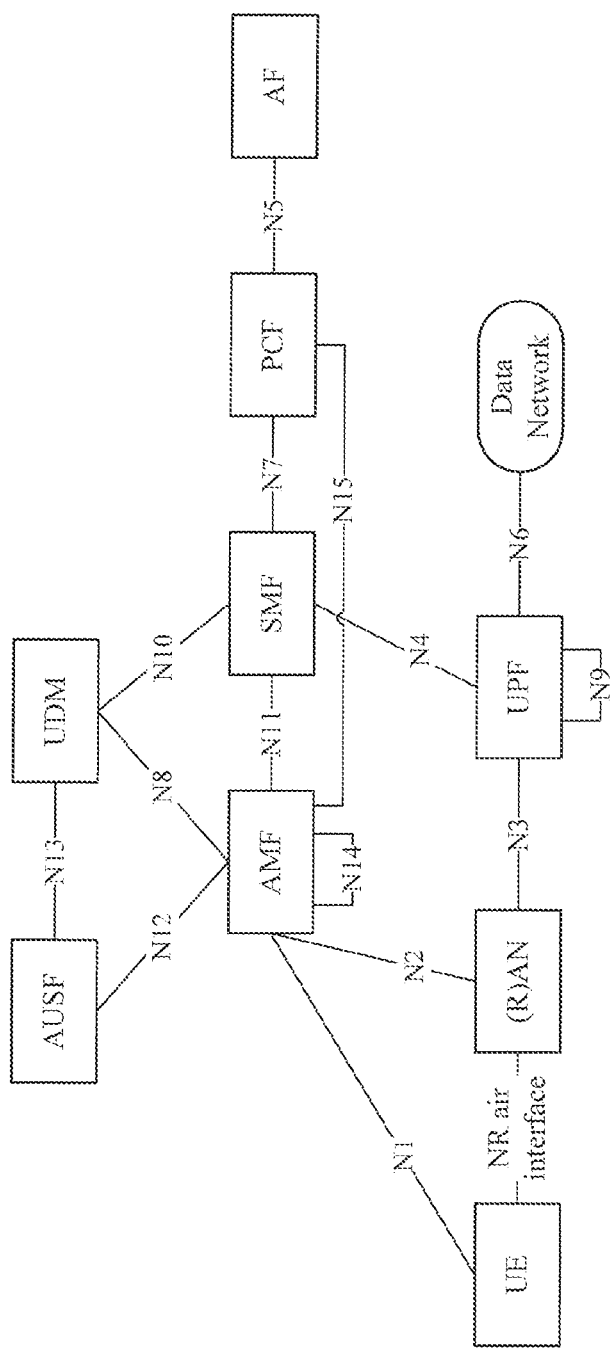
FIG. 1 depicts an exemplifying 5G System architecture in the non-roaming case.

The proposed solutions will now be described more fully hereinafter with reference to the accompanying drawings, in which certain embodiments are shown. These proposed solutions may, however, be embodied in many different forms and should not be construed as limited to the embodiments set forth herein; rather, these embodiments are provided by way of example so that this disclosure will be thorough and complete, and will fully convey the scope of the proposed solutions to those skilled in the art Like numbers refer to like elements throughout the description. Any step or feature illustrated by dashed lines should be regarded as optional.

To handle the different options regarding what IP versions (IPv4 and/or IPv6) to support in a 5G System several different combinations must be considered for the 5GC network. The UE may support IPv4 only, IPv6 only or IPv6+IPv4. The 5GC network may as well support IPv4 only, IPv6 only or IPv6+IPv4 for the requested Domain Network Name (DNN). In addition to this the 5GC network may, in case both IPv4 and IPv6 are supported, allow a UE only supporting IPv4 to connect, as well as allowing a UE only supporting IPv6 to connect.

Thus, there are seven (7) allowed combinations to consider.

| UE capability | 5GC capability | Resulting PDU type of PDU Session |
| --- | --- | --- |
| IPv4 only | IPv4 only | IPv4 |
| IPv6 only | IPv6 only | IPv6 |
| IPv4 only | IPv4 and IPv6 | IPv4 |
| IPv6 only | IPv4 and IPv6 | IPv6 |
| IPv4 and IPv6 | IPv4 only | IPv4 |
| IPv4 and IPv6 | IPv6 only | IPv6 |
| IPv4 and IPv6 | IPv4 and IPv6 | One IPv4 PDU session or one IPv6 PDU session, or one PDU Session of each type |

In view of the seven (7) allowed combinations identified in the table above the following observations can be made: (1) The terminals shall announce the supported PDU types to the network, e.g. PDU sessions of type IPv4, of type IPv6 or both PDU types; (2) Terminals supporting both IPv4 and IPv6 shall be capable to set up dual PDU sessions, one of type IPv4 as well as one of type IPv6; (3) Terminals supporting both IPv4 and IPv6 shall be capable to set up a single PDU session, it may be of type IPv4 or IPv6.

To support this, three different solutions to handle the setup of a PDU session may be identified: (1) The first method is that the UE always tries to set up two PDU sessions, one of type IPv4 and one of type IPv6; (2) Another approach is to always ask for one of the IP versions and use a cause code if the other IP version is to be used as well or instead; (3) A third way to handle this is to let a UE supporting both IP types request both IPv4 and IPv6 types from the 5GC. This would mean that that the UE doesn't require a specific PDU session type, but instead ask for either IPv4 or IPv6.

In alternative A above, the UE will request to set up an IPv4 PDU session as well as an IPv6 PDU session. As no correlation between IPv4 and IPv6 sessions are required, selecting of SMF and UPF can be done independently. The drawback with this approach is that the UE will try to set up dual PDU sessions also in networks where only one IP version is supported. There is currently no support for multiple NAS messages in the 5GC targeting different initial PDU session IDs in the same N1 message, which means that there will be additional signalling with this method, even if only one IP version is to be supported in the network. To make sure that the UE knows which IP-versions to use, both PDU session procedures should be finalized prior to any functionality that is dependent of the IP version combinations used.

In alternative B, the UE always asks for one of the IP versions and then a cause code can be returned to the UE by the 5GC to cause the UE to configure the other IP version as well, or instead if only the other IP version is to be supported. This would for instance be done by setting up a PDU session of IPv6-type first (this would be the normal case when IPv6 is supported in the terminal). If IPv6 is supported in the network this session will be set up, otherwise the PDU session is rejected with a cause code indicating that IPv4 is supported. If both IPv6 and IPv4 is supported by the network, then another cause code is needed to tell the device that it may also set up a PDU session of IPv4-type. Currently UEs are relying on getting immediate information (during the first PDU session setup) whether dual stack is supported or not. This solution preserves that property with less signalling than the first solution A, but it will still result in unnecessary signalling in case the first IP version requested by the UE is not available.

In alternative C, it is suggested that an UE that supports both IPv4 and IPv6 types will always request both IP types from the 5GC. This indicates that the UE is initially not aware of whether a PDU session of type IPv4 or type IPv6 shall be created. This method becomes a bit similar to alternative B, but saves some additional signalling compared to alternative B. For example, for an IPv4 only configuration in the 5GC there is no need to first send an IPv6 request that will be denied by the IPv4 network and then send an IPv4 request, since the network will accept the IPv4 request in the first combined IPv4/IPv6 request. Thus, in alternative C it is assumed that one PDU session of type IPv4 or IPv6 is always set up. If another IP version is to be supported (it is preferred that PDU session type IPv6 shall be used first) this will be informed as in alternative B by sending a cause code that tells the UE that it can set up a PDU session of the other IP version (IPv4) as well if it so decides.

Thus, requesting both IPv4 and IPv6 types from 5GC in the PDU session request is more efficient in terms of signalling.

Figure 2:
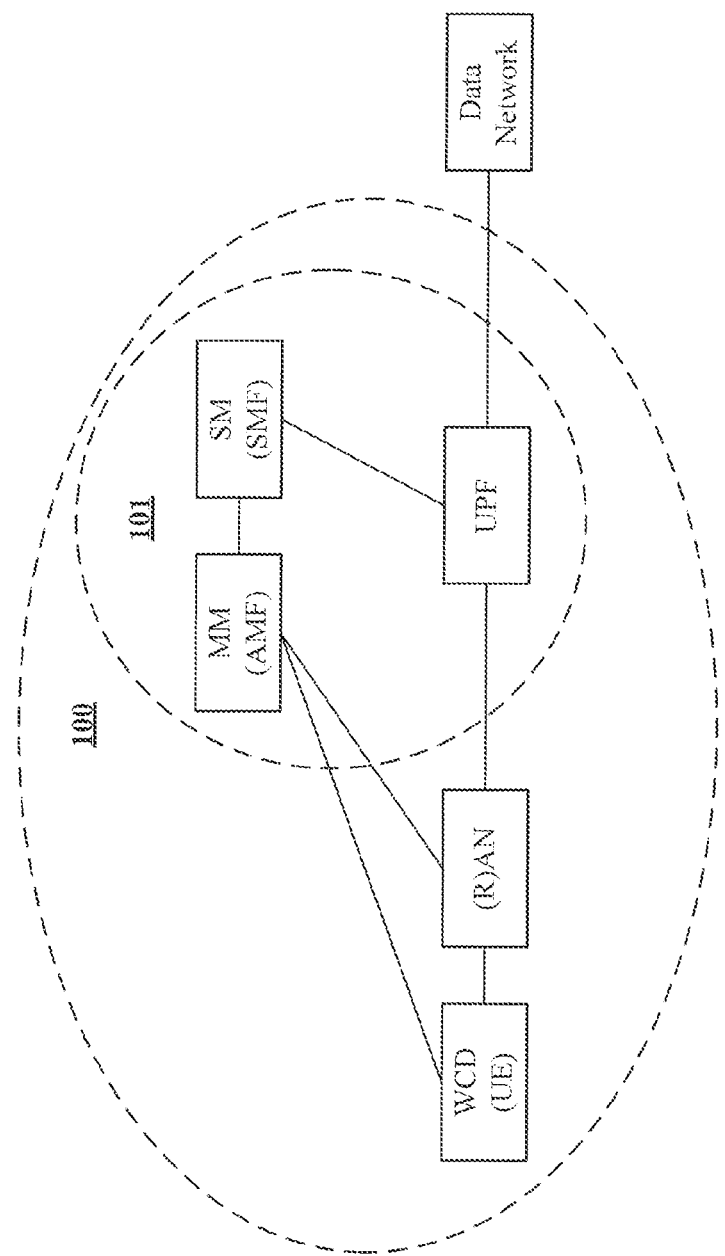
FIG. 2 is a schematic diagram illustrating a communications system 100 where embodiments presented herein can be applied.

FIG. 2 is a schematic diagram illustrating a wireless communications system 100 where embodiments presented herein can be applied. The communications system 100 is preferably a 5G system corresponding to the 5G System presented in FIG. 1. However, other communication systems similar to the 5G System in FIG. 1 can certainly be considered for applying embodiments presented herein.

The communications system 100 comprises at least one Wireless Communication Device (WCD), a Radio Access Network (RAN), a core network (CN) 101 that at least comprises a Mobility Function (MF) node and a Session Management Function (SMF) node. Also, there may be a User Plane Function (UPF) and other core network functions. The system 100 communicates with one or more data networks, such that said at least one WCD can exchange information with a data network and have access to services provided by the data network and/or entities therein, e.g. such as an AF or similar.

Examples of WCDs include, but are not limited to, mobile stations, mobile phones, handsets, wireless local loop phones, user equipment (UE) or similar, smartphones, laptop computers, and tablet computers.

The Radio Access Network (RAN) in FIG. 2 comprises a number of RAN nodes, e.g. such as base stations or similar. The RAN node may be any radio access element capable of wireless communication with the WCD or similar at one end and a 5GC network or similar serving the WCD at the other end.

The Mobility Management (MM) node in FIG. 2 is preferably an 5GC AMF or similar. However, the MF may be any node that manages access control and mobility for a number of WCDs or similar, including the WCD in FIG. 2. Preferably the MF node also includes network slice selection functionality etc.

The Session Management (SM) node in FIG. 2 is preferably a 5GC SMF or similar. However, the SMF may be any node that sets up and manages sessions for a number of WCDs or similar, including the WCD in FIG. 2. Preferably, the set of and managing of sessions is done according to network policy, e.g. received from a 5GC PCG or similar.

MM node and the SM node are exchangeable denoted functions herein. The MM node and the SM node may be implemented in hardware or software or a combination of hardware and software. The MM node and the SM node may be implemented in one (1) single node or in two (2) separate nodes, or in one or more sub-nodes or similar that logically form the function/node in question. The sub-nodes may be located in the same geographic location or different geographic locations.

As the skilled person understands, the communications system 100 may comprise a plurality of WCDs and the herein disclosed embodiments are no limited to any particular number of RAN nodes serving the WCDs, or to any particular number of MM nodes or SM nodes.

The embodiments disclosed herein relates to a method for improving the selection of an IP-version for a PDU session, and to a node/function for performing the method.

Figure 3A:
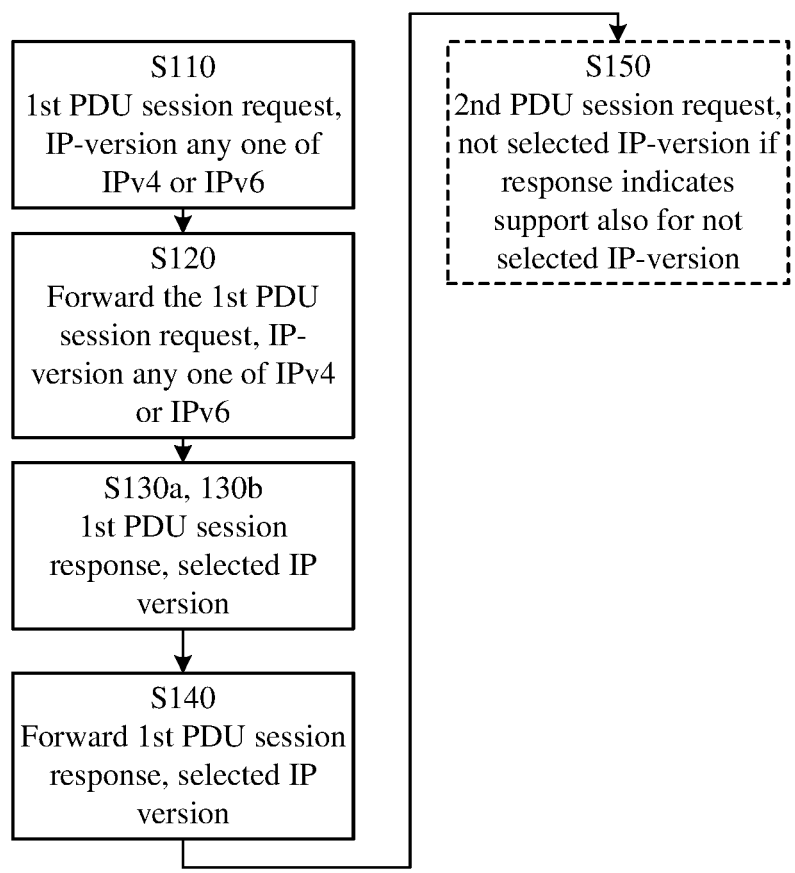
FIG. 3A is a flow chart illustrating embodiments of methods presented herein.

FIG. 3A is a flow chart illustrating embodiments of methods for improving the selection of an IP-version for a PDU session at PDU session establishment for a WCD.

Actions S110-S140 in FIG. 3A correspond to actions with same reference number illustrated in FIG. 3B showing a signalling diagram illustrating embodiments described herein. The nodes/functions in FIG. 3B corresponds to the nodes/functions with the same reference number in FIG. 2. The method is performed by a WCD that supports PDU sessions of both IPv4 type and IPv6 type. The WCD is configured to operatively communicate via the RAN with the SM node in the core network 101 of the wireless communications system 100. The method is performed in a corresponding manner by the SM node that is addressed by the WCD at the PDU session establishment.

In one action S110 of the flowchart in FIG. 3A, the WCD supporting PDU sessions of both IPv4 and IPv6 types sends a first PDU session request message towards the SM node, preferably via the MM node. The PDU session request message requests the establishment of a PDU session. For example, in a 5GC network the message can be sent via the N1 interface indicated in FIG. 1.

The first PDU session request message comprises IP-version information indicating that the IP version of the single PDU session that is requested by the WCD can be any one of IP version (IPv4) or IP version 6 (IPv6). The IP-version information may be any suitable information that indicates to the receiving the SM node that the PDU session request by the WCD is satisfied by the establishment of a single PDU session with IP version of either IPv4 or IPv6. To the receiving SM node, this indicates that the WCD doesn't require any specific IP version (IPv4 or IPv6) for the requested PDU session. In other words, the WCD indicates that the first PDU session request is satisfied by the establishment of a single PDU session of IPv4 or IPv6.

The PDU session request message may be any message that can carry the IP-version information. It is preferred that the first PDU session request message is a PDU session establishment request message and/or that the PDU session request message is a Non Access Stratum (NAS) message.

In another action S120 it is preferred that that the MM node, in response to receiving the PDU session request message, forwards the first PDU session request by sending a SM request message to the SM node. The SM request message comprises, in a similar manner as the PDU session request message above, information indicating that that a single PDU session of either IPv4 type or IPv6 type is requested by the WCD.

The SM request message may be any message that can carry information indicating that that a single PDU session of either IPv4 type or IPv6 type is requested by the WCD. The information may e.g. be the IP-version information or similar sent by the WCD in step 110 above. For example, in a 5GC network the SM request message can be sent via the N11 interface indicated in FIG. 1.

In another action S130a it is preferred that that the SM node, in response to receiving the above SM request message, selects either IPv4 or IPv6 as the IP version for the requested PDU session. The selection may e.g. be done based on DNN configuration and/or operator policies and/or other parameters locally stored in the SM node or readily accessible by the SM node from other nodes/functions.

In a 5GC network, the SMF performs IP address management procedure based on the selected PDU type. If IPv4 PDU type is selected, an IPv4 address is allocated to the UE. Similarly, if IPv6 PDU type is selected, an IPv6 prefix is allocated. The SMF processes the UE IP address management related messages, maintain the corresponding state information and provide the response messages to the UE. In case the UE IP address is obtained from the external data network, additionally, the SMF shall also send the allocation, renewal and release related request messages to the external data network and maintain the corresponding state information.

In another action S130b it is preferred that that the SM node, once the IP version for the requested PDN session is selected by the SM node, then it is preferred that the SM node in FIGS. 2-3 responds to the first PDU session request by sending a SM response message towards the WCD, preferably via the MM node. The SM response message comprises WCD information indicating the IP-version (i.e. IPv4 or IPv6) that has been selected for the requested PDU session. Optionally, the SM node may indicate in the WCD information whether the other IP version—i.e. IPv4 if IPv6 is selected and IPv6 if IPv4 is selected—is also supported. If the other IP version is supported, the WCD may request another PDU Session to the same DNN for the other IP version.

The SM response message may be any message that can carry information indicating the IP-version that has been selected for the requested PDU session. For example, in a 5GC network the SM response message can be sent via the N11 interface indicated in FIG. 1.

In another action S140 it is preferred that the MM node, in response to receiving the above SM response message, forwards the response to the first PDU session request from the SM node by sending a MM response message towards the WCD. The MM response message comprises information indicating the IP-version that has been selected by the SM node for the requested PDU session, and optionally whether the other IP type that was not selected is also supported. The information may be the WCD information or similar sent by the SM node in step 130 above.

The MM response message may be any message that can carry information indicating the IP-version that has been selected for the PDU sessions, and optionally indicating whether the other IP type is supported by the 5GC network. For example, in a 5GC network the MM response message may be sent via the N1 interface or via the RAN and the N2 interface indicated in FIG. 1.

Figure 4:
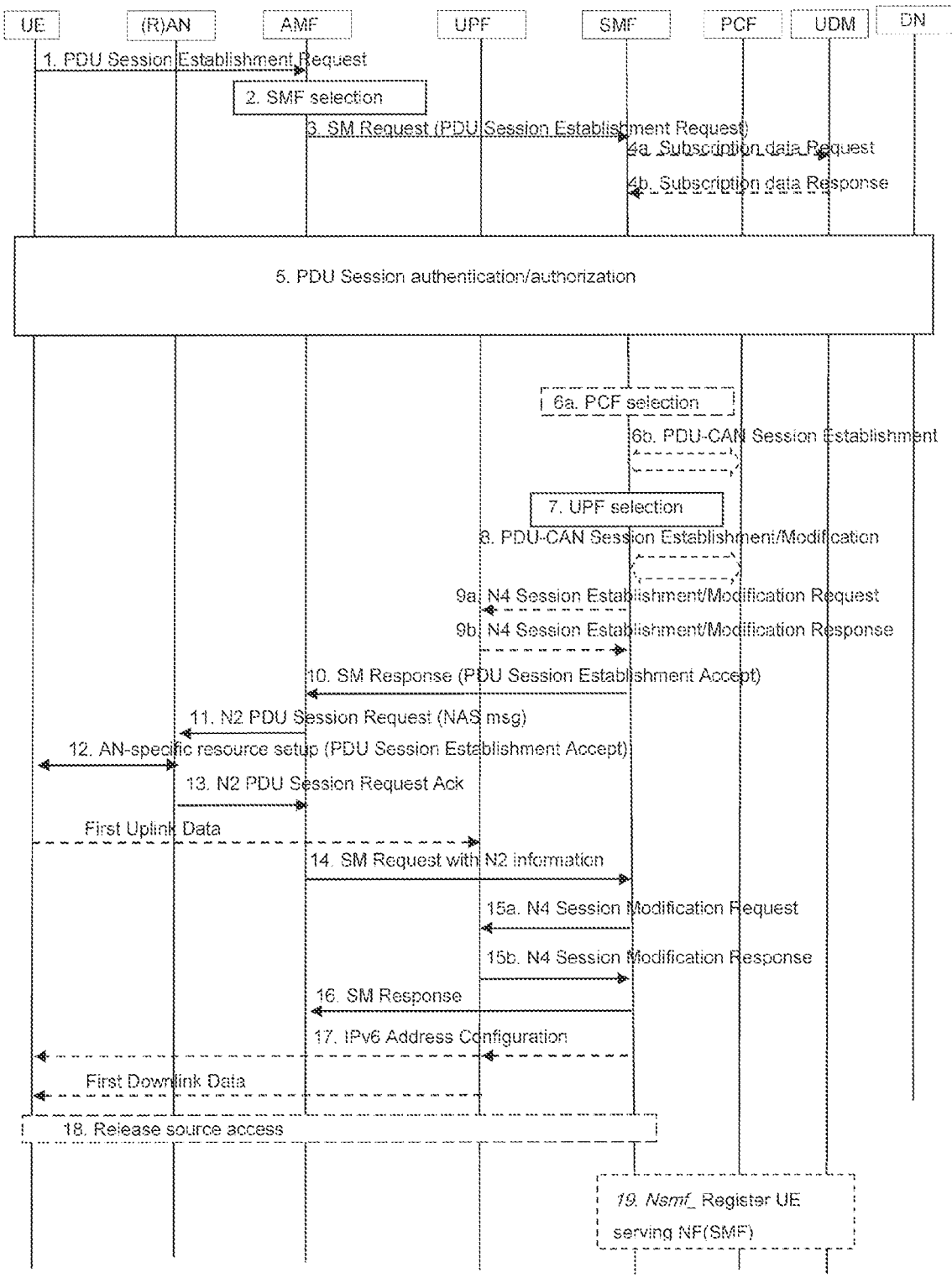
FIG. 4 is a signalling diagram illustrating a preferred embodiment of a method presented herein.

In another action S150 it is preferred that the WCD supporting PDU sessions of both IPv4 and IPv6, when it is indicated in the WCD information that the other IP version is also supported—i.e. IPv4 if IPv6 is selected, and IPv6 if IPv4 is selected—sends a second PDU session request message towards the SM node requesting a second PDU session of the other type. It is preferred that the second PDU session request message is a PDU session establishment request message, and/or that the second PDU session request message is a Non Access Stratum (NAS) message FIG. 3B is a signalling diagram illustrating embodiments of methods for improving the selection of an IP-version for a PDU session at PDU session establishment for a WCD. The actions in FIG. 3B corresponds to the actions in FIG. 3A as indicated below. Furthermore, the actions in FIG. 3B also corresponds to the steps in FIG. 4 as indicated below. FIG. 4 is a signalling diagram illustrating a UE-requested PDU Session Establishment for non-roaming and roaming with local breakout as described in more detail in 3GPP Technical Specification TS 23.502 V0.3.0 (2017-03) clause 4.3.2 and FIG. 4.3.2.2-1.

Action S110 in the signaling diagram of FIG. 3B is preferably the same or very similar as action S110 described above with reference to FIG. 3A.

In an exemplary embodiment, action 110 corresponds to the PDU Session Establishment Request in TS 23.502 clause 4.3.2 FIG. 4.3.2.2-1 step 1 as indicated in FIG. 4 herein, with the addition of the above described IP-version information or similar indicating that the IP version of the requested PDU session can be any one of IPv4 or IPv6.

In TS 23.502 clause 4.3.2 FIG. 4.3.2.2-1 step 1 is described in the following manner: "From UE to AMF: NAS Message (S-NSSAI, DNN, PDU Session ID, Request type, N1 SM information). In order to establish a new PDU session, the UE generates a new PDU Session ID. The UE initiates the UE Requested PDU Session establishment procedure by the transmission of a NAS message containing a PDU Session Establishment Request within the N1 SM information. The PDU Session Establishment Request may include a PDU Type, SSC mode, Protocol Configuration Options. The Request Type indicates "Initial request" if the PDU Session Establishment is a request to establish a new PDU Session and indicates "Existing PDU Session" if the request refers to an existing PDU Session between 3GPP access and non-3GPP access. The NAS message sent by the UE is encapsulated by the AN in a N2 message towards the AMF that should include User location information and Access Technology Type Information. The N1 SM information may contain SM PDU DN Request Container containing information for the PDU session authorization by the external DN."

Action S120 in the signaling diagram of FIG. 3B is preferably the same or very similar as action S120 described above with reference to FIG. 3A.

In an exemplary embodiment, action 120 corresponds to the SM Request in TS 23.502 clause 4.3.2 FIG. 4.3.2.2-1 step 3 as indicated in FIG. 4 herein, with the addition of the above described IP-version information or similar indicating that the IP version of the requested PDU session can be any one of IPv4 or IPv6.

In TS 23.502 clause 4.3.2 FIG. 4.3.2.2-1 step 3 is described in the following manner: "3. From AMF to SMF: SM Request (Subscriber Permanent ID, DNN, S-NSSAI, PDU Session ID, AMF ID, N1 SM information (PDU Session ID, PDU Session Establishment Request), User location information, Access Technology Type)."

Action S130 in the signaling diagram of FIG. 3B is preferably the same or very similar as action S130 described above with reference to FIG. 3A.

In an exemplary embodiment, action 130 corresponds to the SM Response in TS 23.502 clause 4.3.2 FIG. 4.3.2.2-1 step 10 as indicated in FIG. 4 herein, with the addition of the above described WCD-information or similar indicating the IP-version (i.e. IPv4 or IPv6) that has been selected for the requested PDU session.

In TS 23.502 clause 4.3.2 FIG. 4.3.2.2-1 step 10 is described in the following manner:

37 10. SMF to AMF: SM Response (Cause, N2 SM information (PDU Session ID, QoS Profile(s), CN Tunnel Info), N1 SM information (PDU Session Establishment Accept (Authorized QoS Rule, SSC mode, S-NSSAI, allocated IPv4 address))).

Editor's Note: It is FFS how the AMF and SMF associate the N11 transactions with a corresponding UE context.

The N2 SM information carries information that the AMF shall forward to the (R)AN which includes:

The CN Tunnel Info corresponds to the Core Network address of the N3 tunnel corresponding to the PDU session.

The QoS Profile provides the (R)AN with the mapping between QoS parameters and QoS Flow Identifiers. Multiple QoS profiles can be provided to the (R)AN. This is further described in TS 23.501 [2] clause 5.7.

The PDU Session ID may be used by AN signalling with the UE to indicate to the UE the association between AN resources and a PDU session for the UE.

The N1 SM information contains the PDU Session Establishment Accept that the AMF shall provide to the UE.

Multiple Authorized QoS Rules may be included in the PDU Session Establishment Accept within the N1 SM information and in the N2 SM information.

The SM Response further contains PDU Session ID and information allowing the AMF to know which the target UE as well to determine which access towards the UE to use.

NOTE: The access information is to deal with the case where a UE is simultaneously connected over 3GPP and Non 3GPP access.

Editor's note: Further studies are needed to determine the nature of the information allowing the AMF to determine which access towards the UE to use."

Action S140 in the signaling diagram of FIG. 3B is preferably the same or very similar as action S140 described above with reference to FIG. 3A.

In an exemplary embodiment, action 1440 corresponds to the SM Response in TS 23.502 clause 4.3.2 FIG. 4.3.2.2-1 steps 11 and 12 as indicated in FIG. 4 herein, with the addition of the above described WCD-information or similar indicating the IP-version (i.e. IPv4 or IPv6) that has been selected for the requested PDU session, and optionally whether the other IP version— IPv4 if IPv6 is selected and IPv6 if IPv4 is selected—is also supported.

In TS 23.502 clause 4.3.2 FIG. 4.3.2.2-1 steps 11 and 12 are described in the following manner:

"11. AMF to (R)AN: N2 PDU Session Request (N2 SM information, NAS message (PDU Session ID, PDU Session Establishment Accept)).

The AMF sends the NAS message containing PDU Session ID and PDU Session Establishment Accept targeted to the UE and the N2 SM information received from the SMF within the N2 PDU Session Request to the (R)AN.

12. (R)AN to UE: The (R)AN may issue AN specific signalling exchange with the UE that is related with the information received from SMF. For example, in case of a 3GPP RAN, an RRC Connection Reconfiguration may take place with the UE establishing the necessary RAN resources related to the Authorized QoS Rules for the PDU Session request received in step 10.

(R)AN also allocates (R)AN N3 tunnel information for the PDU Session.

(R)AN forwards the NAS message (PDU Session ID, N1 SM information (PDU Session Establishment Accept)) provided in step 10 to the UE. (R)AN shall only provide the NAS message to the UE if the necessary RAN resources are established and the allocation of (R)AN tunnel information are successful."

Figure 5A:
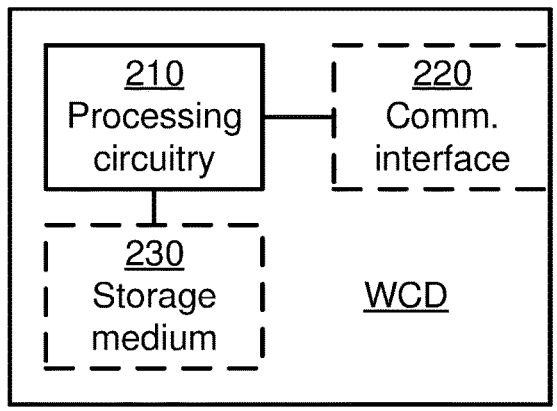
FIG. 5A is a schematic diagram showing functional units of a WCD according to an embodiment.

FIG. 5A schematically illustrates, in terms of a number of functional units, the components of a WCD according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 5C), e.g. in the form of a storage medium 430.

Particularly, the processing circuitry 210 is configured to cause the WCD to perform a set of operations or steps S110, 140 and S150. These operations, or steps have been discussed above. For example, the storage medium 230 may store the set of operations, and the processing circuitry 210 may be configured to retrieve the set of operations from the storage medium 230 to cause the WCD to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The WCD may further comprise a communications interface 220 for communications at least with the RAN and the MM node via the RAN and the SM node via the RAN and the MM node. As such the communications interface 220 may comprise one or more transmitters and receivers, comprising analogue and digital components and a suitable number of antennas for wireless communications and ports for wireline communications.

The processing circuitry 210 controls the general operation of the WCD e.g. by sending data and control signals to the communications interface 220 and the storage medium 230, by receiving data and reports from the communications interface 220, and by retrieving data and instructions from the storage medium 230. Other components, as well as the related functionality, of the WCD are omitted in order not to obscure the concepts presented herein.

Figure 5B:
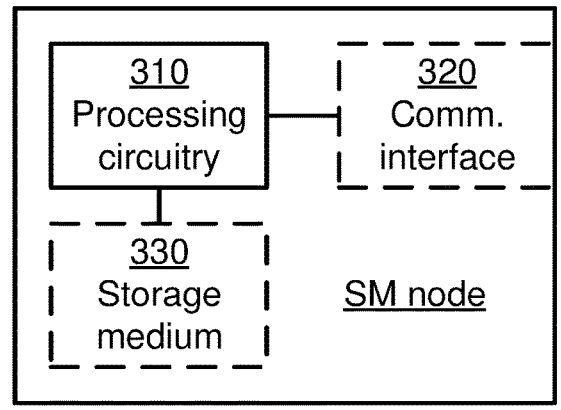
FIG. 5B is a schematic diagram showing functional units of a SM node according to an embodiment.

FIG. 5B schematically illustrates, in terms of a number of functional units, the components of a SM node according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 5C), e.g. in the form of a storage medium 430.

Particularly, the processing circuitry 310 is configured to cause the SM node to perform a set of operations or steps SS120, S130a, S130b. These operations, or steps have been discussed above. For example, the storage medium 330 may store the set of operations, and the processing circuitry 310 may be configured to retrieve the set of operations from the storage medium 330 to cause the SM node to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The SM node may further comprise a communications interface 320 for communications at least with the MM node, and also the WCD via the MM node and the RAN. As such the communications interface 320 may comprise one or more transmitters and receivers, comprising analogue and digital components and a suitable number of antennas for wireless communications and ports for wireline communications.

The processing circuitry 310 controls the general operation of the SM node e.g. by sending data and control signals to the communications interface 320 and the storage medium 330, by receiving data and reports from the communications interface 320, and by retrieving data and instructions from the storage medium 330. Other components, as well as the related functionality, of the WCD are omitted in order not to obscure the concepts presented herein.

Figure 5C:
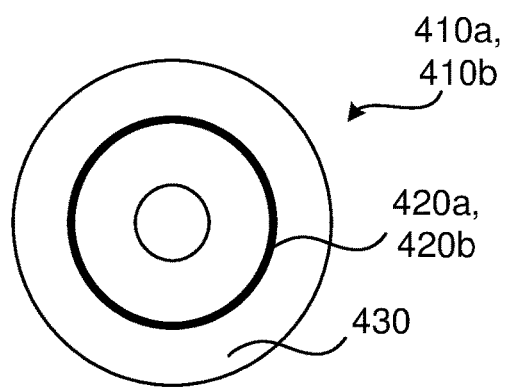
FIG. 5C shows one example of a computer program product comprising computer readable means according to an embodiment.

FIG. 5C shows one example of a computer program product 410a, 410b comprising computer readable means 430. On this computer readable means 430, a computer program 420a can be stored, which computer program 420a can cause the processing circuitry 310 and thereto operatively coupled entities and devices, such as the communications interface 320 and the storage medium 330, to execute methods according to embodiments described herein. The computer program 420a and/or computer program product 410a may thus provide means for performing any steps of the WCD 150a, 150b as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the WCD 150a, 150b as herein disclosed.

In the example of FIG. 5C, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

The proposed solutions have mainly been described above with reference to a few embodiments. Some of these embodiments may be summarised in the following manner using a list of enumerated/itemised exemplifying embodiments.

1. A method for Internet Protocol, IP, version selection for a Protocol Data Unit, PDU, session requested to be established by a Wireless Communication Device, WCD, that supports PDU sessions of both Internet Protocol version 4, IPv4, and Internet Protocol version 6, IPv6, and that is configured to operatively communicate via a Radio Access Network, RAN with a session management, SM, node in a core network (101), the method being performed by the WCD comprises: sending (S110) a first PDU session request message towards the SM node requesting establishment of a first PDU session, which request message comprises IP version information indicating that the IP version of the requested first PDU session should be any one of IPv4 or IPv6; and receiving (S130, S140), in response to sending the first PDU session request message, a first response message, which first response message comprises WCD information indicating the IP version (i.e. IPv4 or IPv6) that has been selected for the requested first PDU session.

2. The method according to item 1, wherein the first request message is a PDU session establishment request message.

3. The method according to any one of item 1 or 2, wherein the first response message is a NAS message comprising the WCD information.

4. The method according to any one of item 1, 2 or 3, wherein the WCD information further indicates that the other IP type that was not selected (IPv4 if IPv6 was selected and IPv6 if IPv4 was selected) is also supported, and where the method being performed by the WCD comprises: sending (S110) a second PDU session request message towards the SM node requesting establishment of a second PDU session, which request message comprises IP version information indicating that the IP version of the requested second PDU session should be any one of IPv4 or IPv6 that was not previously selected.

5. A Wireless Communication Device, WCD, configured to operatively support PDU sessions of both Internet Protocol version 4, IPv4, and Internet Protocol version 6, IPv6, and to operatively communicate via a Radio Access Network, RAN with a session management, SM, node in a core network (101), the WCD comprising processing circuitry (210), the processing circuitry being configured to cause the WCD to operatively: send (S110) a first PDU session request message towards the SM node requesting establishment of a first PDU session, which request message comprises IP version information indicating that the IP version of the requested first PDU session should be any one of IPv4 or IPv6; and receive (S130, S140), in response to sending the first PDU session request message, a first response message, which first response message comprises WCD information indicating the IP version (i.e. IPv4 or IPv6) that has been selected for the requested first PDU session.

6. A method for Internet Protocol, IP, version selection for a Protocol Data Unit, PDU, session requested to be established by a Wireless Communication Device, WCD, that supports PDU sessions of both Internet Protocol version 4, IPv4, and Internet Protocol version 6, IPv6, and that is configured to operatively communicate via a Radio Access Network, RAN with a session management, SM, node in a core network (101), the method being performed by the SM node comprises: receiving (S120) a SM request message requesting establishment of a first PDU session, which SM request message comprises IP version information indicating that the IP version of the requested first PDU session should be any one of IPv4 or IPv6; selecting (S130*a*), in response to receiving the SM request message, an IP version (i.e. IPv4 or IPv6) for the requested first PDU session, and sending (S130*b*, 140) a first response message, which first response message comprises WCD information indicating the IP version (i.e. IPv4 or IPv6) that has been selected for the requested first PDU session.

7. The method according to item 6, wherein it is further indicated in the WCD information that the other IP type not being selected (IPv4 if IPv6 was selected and IPv6 if IPv4 was selected) is also supported.

8. A session management, SM, node in a core network (101) being configured to operatively select an Internet Protocol, IP, version for a Protocol Data Unit, PDU, session requested to be established by a Wireless Communication Device, WCD, that supports PDU sessions of both Internet Protocol version 4, IPv4, and Internet Protocol version 6, IPv6, the SM node comprising processing circuitry (310), the processing circuitry being configured to cause the WCD to operatively: receive (S120) a SM request message requesting establishment of a first PDU session, which SM request message comprises IP version information indicating that the IP version of the requested first PDU session should be any one of IPv4 or IPv6; select (S130*a*), in response to receiving the SM request message, an IP version (i.e. IPv4 or IPv6) for the requested first PDU session, and send (S130*b*, 140) a first response message, which first response message comprises WCD information indicating the IP version (i.e. IPv4 or IPv6) that has been selected for the requested first PDU session.

9. The SM node according to item 8, wherein the SM node is operatively configured to further indicate in the WCD information that the other IP type not being selected (IPv4 if IPv6 was selected and IPv6 if IPv4 was selected) is also supported.

While various aspects and embodiments of the present disclosure have been described above, it should be understood that they have been presented by way of example only, and not limitation. Thus, the breadth and scope of the present disclosure should not be limited by any of the above described exemplary embodiments. Moreover, any combination of the elements described in this disclosure in all possible variations thereof is encompassed by the disclosure unless otherwise indicated herein or otherwise clearly contradicted by context.

Additionally, while the actions and processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for Internet Protocol (IP) version selection for a Protocol Data Unit (PDU) session requested to be established by a wireless communication device (WCD) that supports PDU sessions of both Internet Protocol version 4 (IPv4) and Internet Protocol version 6 (IPv6), and that is configured to operatively communicate via a radio access network (RAN) with a session management (SM) node in a core network, the method being performed by the WCD and comprising:

sending a first PDU session request message towards the SM node requesting establishment of a first PDU session, which request message comprises IP version information indicating that the IP version of the requested first PDU session should be any one of IPv4 or IPv6;

receiving, in response to sending the first PDU session request message, a first response message, which first response message comprises WCD information indicating the IP version that has been selected for the requested first PDU session; and sending a second PDU session request message towards the SM node requesting establishment of a second PDU session, which request message comprises IP version information indicating that the IP version of the requested second PDU session should be any one of IPv4 or IPv6 that was not previously selected.

2. The method of claim 1, wherein the first request message is a PDU session establishment request message.

3. The method of claim 1, wherein the first response message is a NAS message comprising the WCD information.

4. A wireless communication device (WCD) configured to operatively support PDU sessions of both Internet Protocol version 4 (IPv4) and Internet Protocol version 6 (IPv6), and to operatively communicate via a radio access network (RAN) with a session management (SM) node in a core network, the WCD comprising:

processing circuitry, the processing circuitry being configured to cause the WCD to:

send a first PDU session request message towards the SM node requesting establishment of a first PDU session, which request message comprises IP version information indicating that the IP version of the requested first PDU session should be any one of IPv4 or IPv6;

receive, in response to sending the first PDU session request message, a first response message, which first response message comprises WCD information indicating the IP version that has been selected for the requested first PDU session; and send a second PDU session request message towards the SM node requesting establishment of a second PDU session, which request message comprises IP version information indicating that the IP version of the requested second PDU session should be any one of IPv4 or IPv6 that was not previously selected.

5. A method for Internet Protocol (IP) version selection for a Protocol Data Unit (PDU) session requested to be established by a wireless communication device (WCD) that supports PDU sessions of both Internet Protocol version 4 (IPv4) and Internet Protocol version 6 (IPv6), and that is configured to operatively communicate via a radio access network (RAN) with a session management (SM) node in a core network, the method being performed by the SM node and comprising:

receiving a SM request message requesting establishment of a first PDU session, which SM request message comprises IP version information indicating that the IP version of the requested first PDU session should be any one of IPv4 or IPv6;

selecting, in response to receiving the SM request message, an IP version for the requested first PDU session; and sending a first response message, which first response message comprises WCD information indicating the IP version that has been selected for the requested first PDU session, wherein it is further indicated in the WCD information that the other IP version not being selected (IPv4 if IPv6 was selected and IPv6 if IPv4 was selected) is also supported.

6. A session management (SM) node in a core network being configured to operatively select an Internet Protocol (IP) version for a Protocol Data Unit (PDU) session requested to be established by a wireless communication device (WCD) that supports PDU sessions of both Internet Protocol version 4 (IPv4) and Internet Protocol version 6 (IPv6), the SM node comprising processing circuitry, the processing circuitry being configured to cause the WCD to operatively:

receive a SM request message requesting establishment of a first PDU session, which SM request message comprises IP version information indicating that the IP version of the requested first PDU session should be any one of IPv4 or IPv6;

select, in response to receiving the SM request message, an IP version for the requested first PDU session; and send a first response message, which first response message comprises WCD information indicating the IP version that has been selected for the requested first PDU session, wherein it is further indicated in the WCD information that the other IP version not being selected (IPv4 if IPv6 was selected and IPv6 if IPv4 was selected) is also supported.

* * * * *

UNITED STATES PATENT AND TRADEMARK OFFICE
CERTIFICATE OF CORRECTION

| | | |
|---|---|---|
| PATENT NO. | : 11,659,621 B2 | Page 1 of 1 |
| APPLICATION NO. | : 17/837926 | |
| DATED | : May 23, 2023 | |
| INVENTOR(S) | : Backman et al. | |

It is certified that error appears in the above-identified patent and that said Letters Patent is hereby corrected as shown below:

In the Drawings

In Fig. 1, Sheet 1 of 5, delete "Fig 1" and insert -- Fig. 1 --, therefor.

In Fig. 2, Sheet 2 of 5, delete "Fig 2" and insert -- Fig. 2 --, therefor.

In Fig. 4, Sheet 4 of 5, delete "Fig 4" and insert -- Fig. 4 --, therefor.

In the Specification

In Column 1, Line 7, delete "2018 (status pending)," and insert -- 2018, now Pat. No. 11,375,576, --, therefor.

In Column 3, Line 50, delete "(SEA)." and insert -- (SEAF). --, therefor.

In Column 3, Line 55, delete "Context" and insert -- Configuration --, therefor.

In Column 3, Line 56, delete "SEA" and insert -- SEAF --, therefor.

In Column 5, Line 10, delete "network" and insert -- network. --, therefor.

In Column 7, Line 3, delete "Domain" and insert -- Data --, therefor.

In Column 12, Line 6, delete "37 10." and insert -- 10. --, therefor.

Signed and Sealed this
Tenth Day of October, 2023

*Katherine Kelly Vidal*

Katherine Kelly Vidal
*Director of the United States Patent and Trademark Office*